Patented June 18, 1940

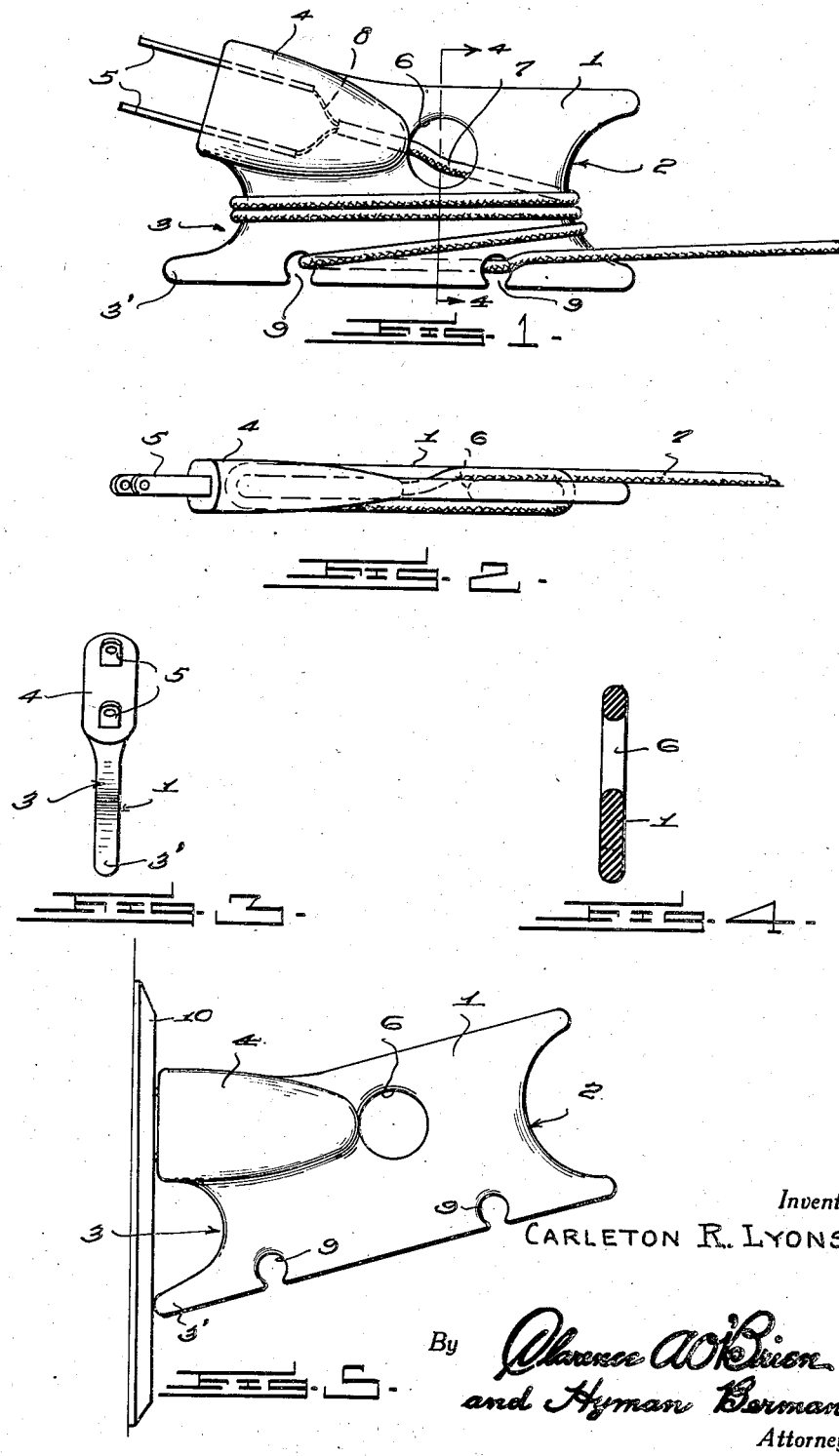

2,204,939

UNITED STATES PATENT OFFICE 2,204,939

COMBINATION ELECTRICAL CORD REEL AND OUTLET PLUG

Carleton R. Lyons, Elmore, Minn.

Application July 25, 1939, Serial No. 286,454

1 Claim. (Cl. 173—361)

This invention relates to a combined reel and outlet plug, the general object of the invention being to provide a reel for the electrical cord with the device carrying prongs for entering the slots of an outlet socket or box with the cord connected with the prongs so that the cord can be wound on the reel when not in use or partly wound thereon when in use.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is an elevation of the invention with the cord partly wound thereon.

Figure 2 is an edge view of the device.

Figure 3 is a view looking toward that end from which the prongs project.

Figure 4 is a section on the line 4—4 of Figure 1 with the cord removed.

Figure 5 is a view of the device with the prongs inserted in a socket or outlet box.

In these views the numeral 1 indicates a flat board-like member having substantially semi-circular recesses 2 and 3 in its ends so that the member is made substantially in the form of a type of reel now on the market. However, in carrying out the invention that end of the device which has the recess 3 therein is provided with an enlarged part 4 which carries the prongs 5 which are spaced apart and which are adapted to enter the outlet box or socket of an electric system. The part 4 tapers from that end from which the prongs 5 project to its other end and adjacent said other end is a large hole 6 in the member 1 for the passage of the cable or electric cord 7, one end of this cord entering the small end of the part 4 with the stripped wires 8 of the cord fastened to the inner end of the prongs 5 as shown in dotted line in Figure 1. The cord 7 after passing through the opening 6 can be wound around the reel by passing through the recesses 2 and 3 and in order to prevent the cord from unwinding from the device I provide a pair of substantially keyhole-shaped openings 9 in the device 1 at one edge thereof through which the cord is passed as shown in Figure 1.

That end of the device which carries the enlargement 4 and the recess 3 is made inclined so that when the prongs are inserted into a socket or outlet box, the horn 3' formed by the recess 3 will rest against the cover plate 10 of the outlet box as shown in Figure 5 so that the recess 3 is closed by the plate 10 and thus the cord cannot leave the recess.

From the foregoing it will be seen that I have provided simple means associated with a plug for winding the electrical cord thereon so that the slack in the cord can be taken up and by arranging the parts as shown in Figure 1 with the cord 7 entering the hole 6 and then being embedded in the small end of the part 4 there is no danger of the parts being pulled out of engagement if a pull is exerted upon the cord nor would such a pull tend to pull the plug out of engagement with the outlet box or socket.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A combination reel and plug for attaching a service line to a wall socket comprising a plate of elongated rectangular form having concave ends adapting the plate for the winding of the line around the same lengthwise thereof, said plate having a barrel-like part extending lengthwise from one end and corner thereof in the plane of the plate whereby the outer end of the barrel and the adjacent opposite corner of the plate may be positioned against said socket to close the concavity in said end of the plate and thereby confine the windings to retain the same on said plate, a pair of prongs extending endwise from the outer end of the barrel-like part for plugging into said socket whereby said outer end of the part and said opposite corner are held in position against said socket, and a service line extending into the inner end of the barrel-like part and connected to said prongs, said plate being provided in one longitudinal edge thereof with spaced notches through which the line after winding is adapted to be reeved to frictionally interlock with the plate against unwinding.

CARLETON R. LYONS.